United States Patent
Koppolu et al.

(10) Patent No.: US 10,609,159 B2
(45) Date of Patent: Mar. 31, 2020

(54) PROVIDING HIGHER WORKLOAD RESILIENCY IN CLUSTERED SYSTEMS BASED ON HEALTH HEURISTICS

(71) Applicant: Microsoft Technology Licensing, LLC, Redmond, WA (US)

(72) Inventors: Lokesh Srinivas Koppolu, Redmond, WA (US); David A. Dion, Bothell, WA (US); Abhinit Kumar, Bellevue, WA (US); Amitabh P. Tamhane, Redmond, WA (US); Andrea D'Amato, Kirkland, WA (US); Daniel Upton, Bellevue, WA (US); Elden T. Christensen, Sammamish, WA (US); Nicholas Maliwacki, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1072 days.

(21) Appl. No.: 14/551,078

(22) Filed: Nov. 24, 2014

(65) Prior Publication Data
US 2016/0036924 A1 Feb. 4, 2016

Related U.S. Application Data

(60) Provisional application No. 62/033,066, filed on Aug. 4, 2014.

(51) Int. Cl.
*H04L 29/08* (2006.01)
*H04L 12/26* (2006.01)
(Continued)

(52) U.S. Cl.
CPC ............ *H04L 67/16* (2013.01); *G06F 9/5088* (2013.01); *G06F 11/3006* (2013.01);
(Continued)

(58) Field of Classification Search
CPC ... H04L 67/16; H04L 67/1025; H04L 67/322; H04L 43/04; H04L 43/10; H04L 29/08;
(Continued)

(56) References Cited

U.S. PATENT DOCUMENTS 5,991,272 A * 11/1999 Key .................... H04L 12/5602
370/252
7,467,145 B1 * 12/2008 Castellanos ............ G06Q 10/06
(Continued)

OTHER PUBLICATIONS

European Patent Office, "Notification of Transmittal of the International Search Report and Written Opinion of the International Searching Authority," issued in PCT Application No. PCT/US2015/043039, dated Dec. 16, 2015, 12 Pages.

*Primary Examiner* — Tonia L Dollinger
*Assistant Examiner* — Mehulkumar J Shah
(74) *Attorney, Agent, or Firm* — Liang IP, PLLC

(57) ABSTRACT

Embodiments provide workload processing for clustered systems. In an illustrative, non-limiting embodiment, a computer-implemented method may include identifying a server as an active node of a cluster; assigning a workload to the server in response to the identification; determining, after the assignment, that the server is no longer an active node of the cluster; calculating, in response to the determination, a probability that the server is capable of continuing to execute the workload; and deciding, based upon the probability, whether to allow the workload to remain assigned to the server.

20 Claims, 5 Drawing Sheets

(51) Int. Cl.
  *G06F 11/30* (2006.01)
  *G06F 9/50* (2006.01)
(52) U.S. Cl.
  CPC .............. *H04L 43/04* (2013.01); *H04L 43/10* (2013.01); *H04L 67/1025* (2013.01); *H04L 67/322* (2013.01)
(58) Field of Classification Search
  CPC ... H04L 12/26; H04L 29/08072; H04L 29/06; H04L 43/00; H04L 12/2602; H04L 41/22; G06F 11/3006; G06F 9/5088; G06F 11/30; G06F 9/50
  USPC ........... 709/224; 340/16.1; 370/252; 714/39, 714/47.1–47.3
  See application file for complete search history.

(56) References Cited

U.S. PATENT DOCUMENTS

| | | | | |
|---|---|---|---|---|
| 7,900,206 B1* | 3/2011 | Joshi | ................ | G06F 9/505 709/223 |
| 8,087,025 B1* | 12/2011 | Graupner | ................ | G06F 9/505 718/104 |
| 8,621,062 B1* | 12/2013 | Anderson | ................ | G06F 11/30 709/223 |
| 9,292,371 B1* | 3/2016 | Clifford | .............. | H04L 43/0817 |
| 9,419,854 B1* | 8/2016 | Wang | ...................... | H04L 41/00 |
| 2003/0079154 A1* | 4/2003 | Park | .................... | G06F 11/1438 714/1 |
| 2004/0153866 A1* | 8/2004 | Guimbellot | ............... | H04L 1/22 714/4.11 |
| 2004/0243709 A1* | 12/2004 | Kalyanavarathan | .. | G06F 9/5033 709/226 |
| 2007/0233865 A1* | 10/2007 | Garbow | .............. | G06F 11/0796 709/226 |
| 2009/0158016 A1* | 6/2009 | Clarke | .................. | G06F 9/3885 712/229 |
| 2010/0306163 A1* | 12/2010 | Beaty | .................... | G06F 9/5077 706/52 |
| 2012/0284408 A1* | 11/2012 | Dutta | .................... | G06F 9/5066 709/226 |
| 2013/0031424 A1 | 1/2013 | Srivastava et al. | | |
| 2013/0054806 A1* | 2/2013 | Francis | ............... | H04L 67/1002 709/226 |
| 2013/0185667 A1* | 7/2013 | Harper | ................ | G06F 11/0709 715/772 |
| 2014/0053226 A1 | 2/2014 | Fadida et al. | | |
| 2014/0215481 A1* | 7/2014 | Piet | ........................ | G06F 9/5061 718/104 |
| 2015/0074035 A1* | 3/2015 | Narasappa | ............. | G06N 7/005 706/52 |
| 2015/0227426 A1* | 8/2015 | Andrade Costa | ... | G06F 11/1415 714/47.3 |

\* cited by examiner

PROVIDING HIGHER WORKLOAD RESILIENCY IN CLUSTERED SYSTEMS BASED ON HEALTH HEURISTICS

CROSS-REFERENCE TO RELATED APPLICATIONS

This application claims the benefit of the filing date of U.S. Provisional Patent Application No. 62/033,066, which is titled "Providing Higher Workload Resiliency in Clustered Systems Based on Health Heuristics" and was filed Aug. 4, 2014, the disclosure of which is hereby incorporated by reference herein in its entirety.

BACKGROUND

Cloud computing enables ubiquitous, on-demand network access to a shared pool of configurable computing resources that can be rapidly provisioned and released with minimal management effort or service provider interaction. The resources may include, for example, processing, servers, storage, applications, network bandwidth, and services. A typical cloud model provides on-demand self-service, broad network access, resource pooling, rapid elasticity and measured service. Cloud consumers unilaterally provision computing capabilities as needed without requiring service provider interaction. The cloud services are available over public and/or private networks and are accessed using standard mechanisms. The cloud provider's computing resources are pooled so that they may be used to serve multiple consumers by dynamically assigning and reassigning physical and virtual resources according to consumer demand (i.e., multi-tenant).

The cloud consumer (or "client") generally has no control or knowledge over the location of the provided resources which may be supported by one or more distributed datacenters. Cloud services are elastically provisioned and released to allow for rapid scaling with demand. As a result, capabilities may appear to the client as unlimited and available for provisioning in any quantity at any time. Moreover, cloud systems automatically control and optimize resource use by leveraging a metering capability appropriate to the type of service.

When a resource fails in the cloud datacenter, the workload on the failed resource may be moved to a new resource, such as a resource that was specifically designated to operate as a backup or a newly spun up resource. Clients generally do not control when the workloads are moved between such resources during such a failure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Servers or nodes in a datacenter may be organized into clusters that cooperatively assign workloads to specific nodes. The nodes may be required to meet specific requirements, such as providing health status reports, in order to join the cluster as an active member. The nodes may be removed as an active member of a cluster if it does not meet the requirements. Advantageously, a node may be allowed to continue running an assigned workload while the node attempts to rejoin the cluster as an active member. The active members of the cluster may apply heuristics to information known about an inactive node to determine the probability that a node can recover from a failure. The cluster may advantageously allow the inactive node to continue running the assigned workloads for a period of time, which will reduce or eliminate inefficiencies caused by migrating reassigning ownership of workloads to other active cluster nodes when the inactive node can recover and rejoin the cluster as an active node.

Embodiments provide workload processing for clustered systems. In an illustrative, non-limiting embodiment, a computer-implemented method may include identifying a server as an active node of a cluster; assigning a workload to the server in response to the identification; determining, after the assignment, that the server is no longer an active node of the cluster; calculating, in response to the determination, a probability that the server is capable of continuing to execute the workload; and deciding, based upon the probability, whether to allow the workload to remain assigned to the server. The policy for allowing workloads to remain assigned to an inactive server may further depend upon the nature of the workload (e.g., whether the workload stateful or stateless), the priority of the workload, or other characteristics of the workload that are specified by the datacenter administrator.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
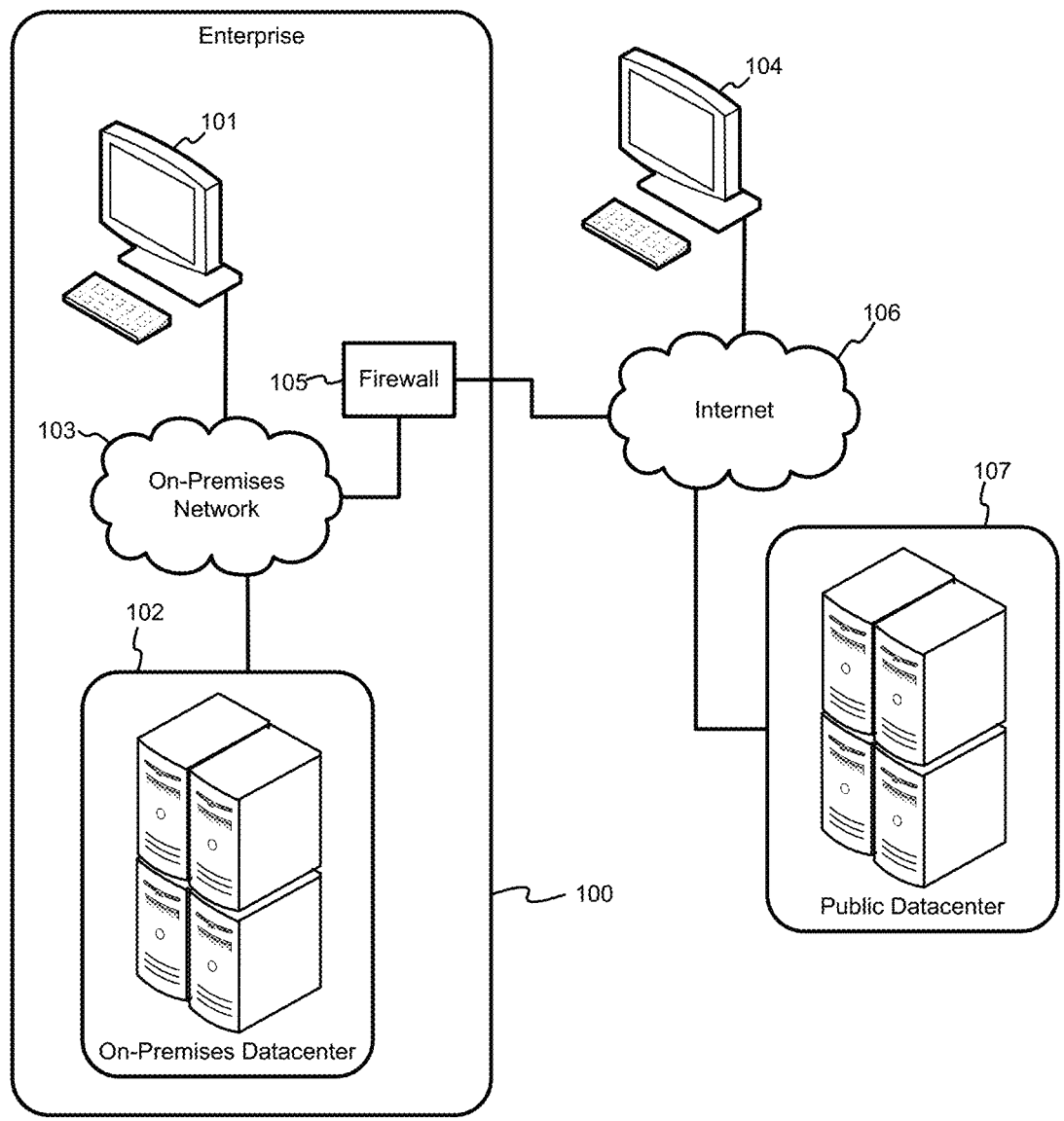
FIG. 1 is a high level block diagram of an example of a system configured to provide enterprise users with access to local, on-premises resources and to remote or public resources according to some embodiments.

FIG. 1 is a high level block diagram of an example of a system configured to provide enterprise users with access to local, on-premises resources and to remote or public resources, according to some embodiments. Local enterprise terminal 101 allows users to directly access on-premises datacenter 102 via on-premises network 103. Users located outside enterprise 100 may access on-premises datacenter 102 using remote terminal 104. Terminals 101 and 104 may be, for example, a desktop, laptop, notebook, or tablet computer. Other devices, such as dedicated terminals, smartphones, personal digital assistants (PDA), etc. may also be used as terminals 101 and 104.

Firewall 105 provides network security system for enterprise 100 and controls incoming and outgoing network traffic. External terminal 104 may connect to enterprise on-premises network 103 via Internet 106 or any public or private network. Firewall 105 allows terminal 104 to access on-premises datacenter 102 if terminal 104 provides the appropriate credentials and authentication. Enterprise users at terminals 101 and 104 may also access public datacenter 107 via Internet 106.

On-premises datacenter 102 and public datacenter 107 may provide "cloud computing" services to enterprise 100 and other users. By freeing enterprise users from managing information technology (IT) infrastructure, cloud computing provides virtually limitless compute, storage, and network resources at low cost, while allowing services to scale on demand.

Figure 2:
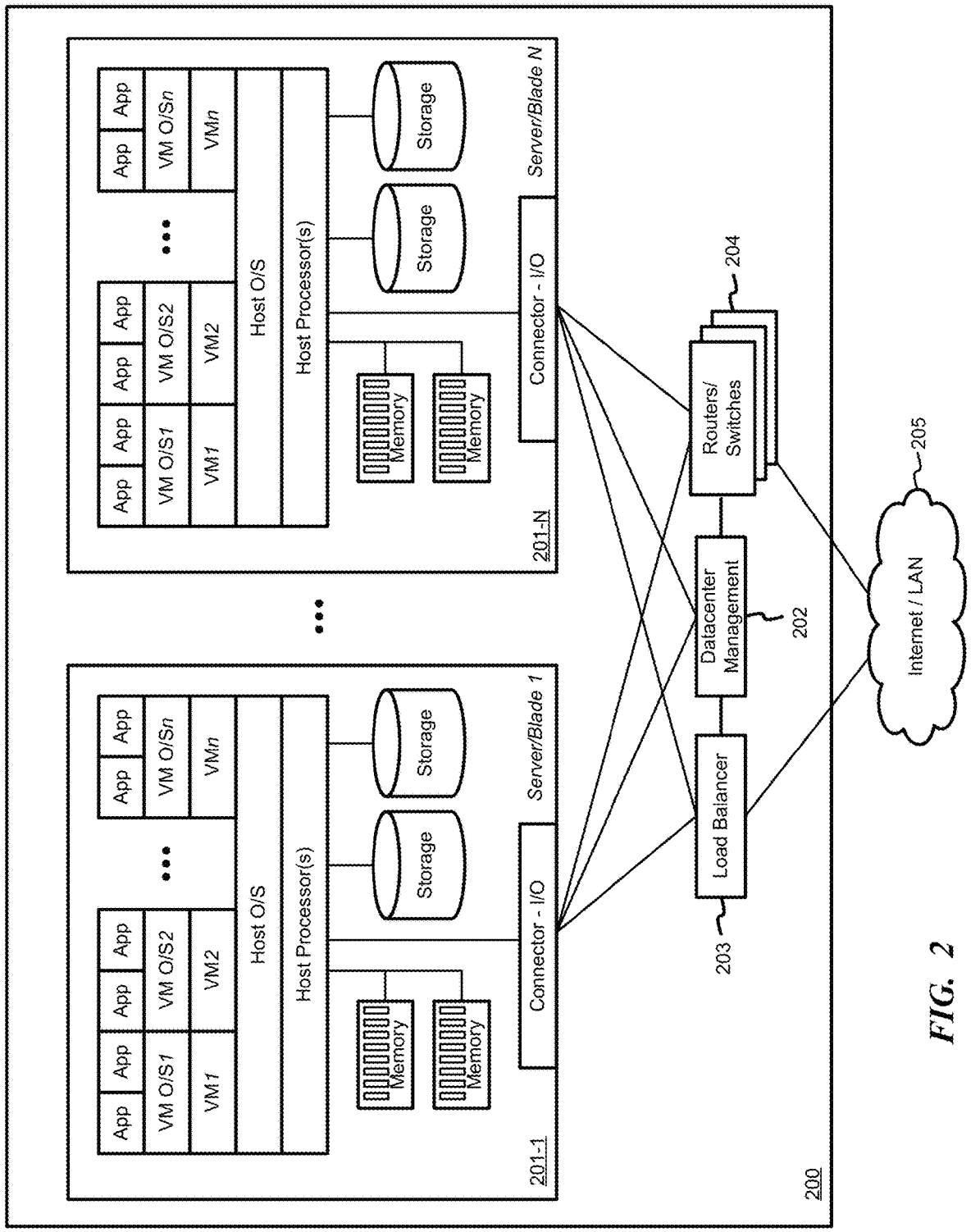
FIG. 2 is a block diagram of an example of a datacenter configured to provide cloud computing services or distributed computing services according to some embodiments.

FIG. 2 is a block diagram of an example of datacenter 200 configured to provide cloud computing services or distributed computing services. In some embodiments, datacenter may implement on-premises datacenter 102 or public datacenter 107 of FIG. 1. Servers or nodes 201-1-N are managed by datacenter management controller 202. Load balancer 203 distributes requests and workloads over servers or nodes 201-1-N to avoid a situation where a single server becomes overwhelmed and to maximize available capacity and performance of the resources in datacenter 200. Routers/switches 204 support data traffic between servers or nodes 201-1-N and between datacenter 200 and external resources and users via external network 205, which may be a local area network (LAN) in the case of an enterprise, on-premises datacenter 102 or the Internet in the case of public datacenter 107.

Servers or nodes 201-1-N may be traditional standalone computing devices and/or they may be configured as individual blades in a rack of many server devices. Servers or nodes 201-1-N have an input/output (I/O) connector that manages communication with other database entities. One or more host processors on each server or node 201-1-N run a host operating system (O/S) that supports multiple virtual machines (VM). Each VM may run its own O/S so that each VM O/S on a server is different, or the same, or a mix of both. The VM O/S's may be, for example, different versions of the same O/S (e.g., different VMs running different current and legacy versions of the Windows® operating system). In addition, or alternatively, the VM O/S's may be provided by different manufacturers (e.g., some VMs running the Windows® operating system, while others VMs run the Linux® operating system). Each VM may then run one or more applications (App). Each server also includes storage (e.g., hard disk drives (HDD)) and memory (e.g., RAM) that can be accessed and used by the host processors and VMs.

In some cases, each VM may be considered to be a "workload." Additionally or alternatively, each App run within a given VM may be considered to be a workload. As illustrated in the example embodiment of FIG. 2, VM/App workloads and storage are running on the same nodes. In other datacenter configurations, some nodes may be dedicated to storage and while other nodes are dedicated to VMs. The VMs in this configuration access their data by communicating with the storage nodes via the datacenter network. In further embodiments, a VM's data is resident not only in the storage on the host where the VM is running, but also in one or more other locations. In this configuration, a VM may failover to a different host when the original host is inaccessible and may continue to access its data at the other locations.

Cloud computing is the delivery of computing capabilities as a service, making access to IT resources like compute power, networking and storage as available as water from a faucet. As with any utility, you generally only pay for what you use with cloud computing. By tapping into cloud services, you can harness the power of massive data centers without having to build, manage or maintain costly, complex IT building blocks. With the cloud, much of the complexity of IT is abstracted away, letting you focus just on the infrastructure, data and application development that really matter to your business.

Datacenter 200 provides pooled resources on which customers or tenants can dynamically provision and scale applications as needed without having to add more servers or additional networking. This allows tenants to obtain the computing resources they need without having to procure, provision, and manage infrastructure on a per-application, ad-hoc basis. Cloud computing datacenter 200 allows tenants to scale up or scale down resources dynamically to meet the current needs of their business. Additionally, a datacenter operator can provide usage-based services to tenants so that they pay for only the resources they use, when they need to use them. For example, a tenant may initially use one VM on server 201-1 to run their applications. When demand increases, the datacenter may activate additional VMs on the same server and/or on a new server 201-N as needed. These additional VMs can be deactivated if demand later drops.

Although datacenter 200 is illustrated as a single location, it will be understood that servers 201-1-N may be distributed to multiple locations across the globe to provide additional redundancy and disaster recovery capabilities. Datacenter 200 may offer guaranteed availability, disaster recovery, and back-up services. For example, the datacenter may designate one VM on server 201-1 as the primary location for the tenant's application and may activate a second VM on the same or different server as a standby or back-up in case the first VM or server 201-1 fails. Datacenter management 202 automatically shifts incoming user requests from the primary VM to the back-up VM without requiring tenant intervention. In another failure recovery mode, if server 201-1 fails, datacenter manager 202 recreates the VMs from server 201-1 on one or more different servers. In this configuration, there are not two VMs running initially, which preserves datacenter resources. The second VM is created on-demand only when a failure is detected. These approaches may be combined for additional availability and disaster recovery. For example, there may be multiple VMs allocated for a tenant's application and in the event of failures, not only will the datacenter (or cluster with quorum, acting as a datacenter manager) redirect clients to the new active VM, but it will also re-instantiate the failed VM so that it can now be the backup.

The datacenter operator may offer different levels of cloud computing services to tenants. With an Infrastructure-as-a-Service (IaaS) offering, the lower levels of the IT stack are delivered as a service, which frees up developers from much of the complexity of provisioning physical machines and configuring networks. With IaaS, tenants can easily provision virtual machines in a highly scalable and available cloud environment, develop and test solutions, then deploy applications to production. With a Platform-as-a-Service (PaaS) offering, everything from network connectivity through the runtime is provided. PaaS makes development easy by providing additional support for application services and management of the operating system, including updates. With PaaS, tenants can focus on the business logic of application and quickly move applications from concept to launch. With a Software-as-a-Service (SaaS) offering, a single finished application or suite of applications can be delivered to customers through a web browser, thereby eliminating their need to manage the underlying components of the IT stack including application code.

To provide flexible and robust datacenter services and resources, a number of server computers or "nodes" may be configured to work together as a computer "cluster." Generally speaking, a "cluster" connects two or more servers together so that they appear as a single computer to clients. Connecting servers or nodes in a cluster may allow for workload sharing, enable a single point of operation/management, and/or provide a path for scaling to meet increased demand.

In order to become an active member of a given cluster, a node must communicate its health or ability to host workloads to other active nodes of the cluster. This can be done directly by sending communication over the network or indirectly by communicating through shared storage. For example, a node may need to have certain communications capabilities, access to a common storage database, etc. During operation, an active node may be assigned one or more workloads (e.g., a virtual machine, etc.). If the active node is determined to no longer have at least one of those characteristics or capabilities, that node must then be excluded from the cluster.

In some implementations, server or nodes 201-1-N of datacenter 200 may operate as a server cluster. A server cluster may include a group of independent servers working together as a single system to provide high availability of services for clients. When a failure occurs on one computer in a cluster, resources are redirected and the workload is redistributed to another computer in the cluster. In some cases, server clusters may be employed to ensure that users have constant access to important server-based resources.

Server clusters are designed for applications that have long-running in-memory state or frequently updated data. Typical uses for server clusters include virtual machine hosts/servers, file servers, print servers, database servers, and messaging servers. Again, a cluster comprises of two or more computers working together to provide a higher level of availability, reliability, and scalability than can be obtained by using a single computer. As such cluster technologies guard against certain types of failure including, but not limited to: (a) application and service failures, which affect application software and essential services; (b) system and hardware failures, which affect hardware components such as CPUs, drives, memory, network adapters, and power supplies; and (c) site failures in multisite organizations, which can be caused by natural disasters, power outages, or connectivity outages.

The ability to handle failure allows server clusters to meet requirements for high availability, which is the ability to provide users with access to a service for a high percentage of time while reducing unscheduled outages.

Datacenter 200 provides multiple cluster servers that can host applications or services. Absent failures, the data required to run the applications or services is accessible from any of these servers. An application may not know where its data actually resides. For example, that information may be abstracted from the application by the datacenter or the cluster. The application is assigned to run on a node and accesses its data through some abstracted interface. Depending on the configuration of the application and the data facilities provided by the datacenter, the data interface may be, for example, an apparently local file system interface, a network file system interface, or some other kind of remote data store interface.

Clusters maintain configuration data, which they make highly available through a combination of replicating the configuration data among multiple cluster nodes and storing the data on external and mutually accessible devices. The quorum configuration in a cluster determines the number of failures that the cluster can sustain while still remaining online. If an additional failure occurs beyond this threshold, the cluster will stop running Having quorum, or a majority of voters, is based on a voting algorithm where more than half of the voters must be online and able to communicate with each other. Because a given cluster has a specific set of nodes and a specific quorum configuration, the cluster will know how many "votes" constitutes a majority of votes, or quorum. For a node to be a fully active participant in the cluster, the node needs to be able to communicate with the other nodes in the cluster and to fulfill its role in the cluster. If a node is unable to remain an active participant of the cluster, the remaining nodes can still achieve quorum and thereby continue to take actions as a cluster.

Quorum is design to handle the scenario when there is a problem with communication between sets of cluster nodes. This avoids a "split brain" scenario in which two servers try to simultaneously host a resource group and write to the same disk at the same time. With quorum, the cluster will force the cluster service to stop in one of the subsets of nodes to ensure that there is only one true owner of a particular resource group. Once the stopped nodes can once again communicate with the main group of nodes, the nodes will automatically rejoin the cluster and start their cluster service.

Figure 3:
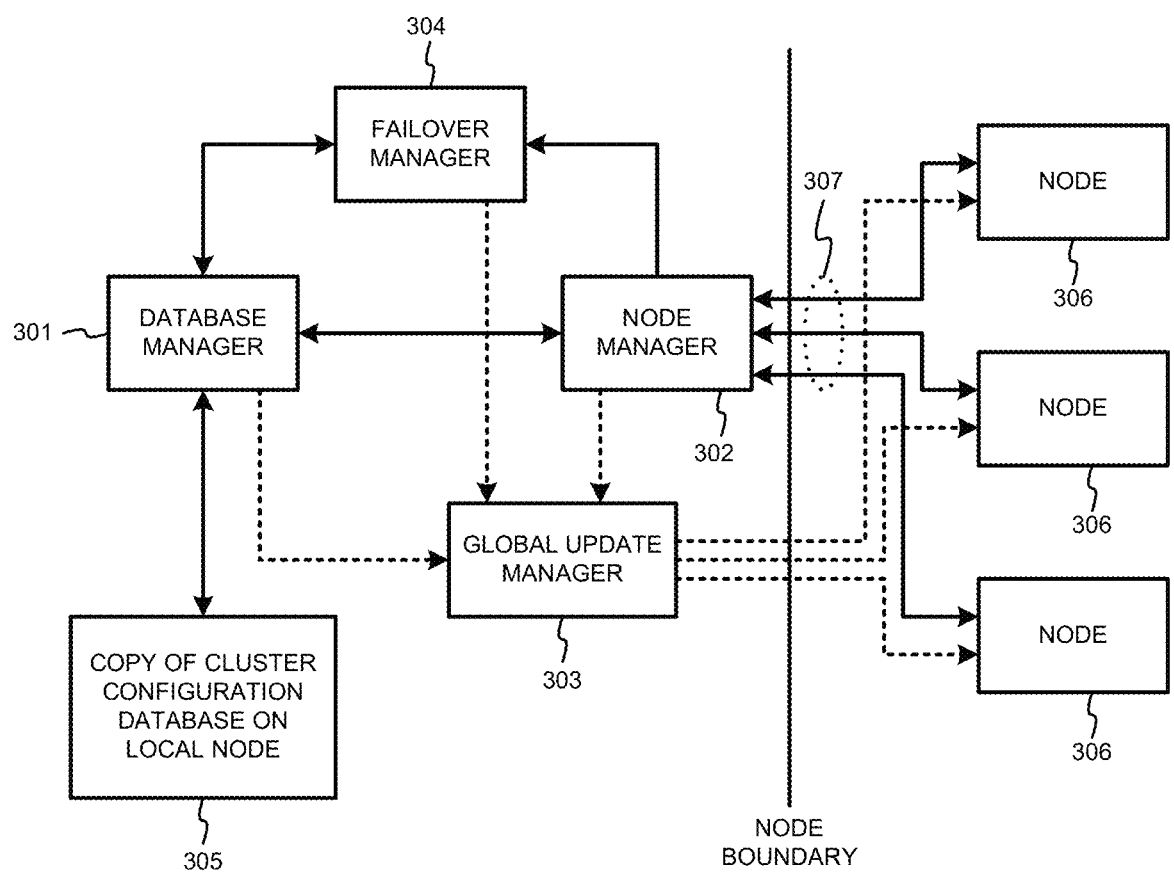
FIG. 3 is a block diagram of an example of cluster components according to some embodiments.

FIG. 3 is a simplified block diagram of an example of cluster components according to an example embodiment. It will be understood that nodes and cluster components may be embodied in many different physical topologies. Generally speaking, components 301-304 work together to ensure that all nodes 306 maintain a consistent view of the cluster (with each node of the cluster maintaining the same view of the state of the member nodes as the others), and that resource groups can be failed over smoothly when needed.

Database manager 301 runs on each node and maintains a local copy of the cluster configuration database 305, which contains information about all of the physical and logical items in a cluster. These items include the cluster itself, cluster node membership, resource groups, resource types, and descriptions of specific resources, such as disks and IP addresses. Database manager 301 uses global update manager 303 to replicate all changes to the other nodes in the cluster. In this way, consistent configuration information is maintained across the cluster, even if conditions are changing such as if a node fails and the administrator changes the cluster configuration before that node returns to service.

Database manager 301 also provides an interface through which other cluster service components, such as failover manager 304 and node manager 302, can store changes in the cluster configuration database. The key difference is that changes received by database manager 301 are replicated through global update manager 303 to all nodes in the cluster.

Node manager 302 runs on each node and maintains a local list of nodes, networks, and network interfaces in the cluster. Through regular communication between nodes, node manager 302 ensures that all nodes in the cluster have the same list of functional nodes. In other embodiments, the node manager functions may be provided by more than one component. Node manager 302 uses the information in cluster configuration database 305 to determine which nodes have been added to the cluster or evicted from the cluster. Each instance of node manager 302 also monitors the other nodes 306 to detect node failure. It does this by sending and receiving messages, called heartbeats 307, to each node on every available network. If one node detects a communication failure with another node, it may broadcast a message to the entire cluster, causing all nodes that receive the message to verify their list of functional nodes in the cluster.

In some embodiments, nodes may be classified or designated as "active" if it is executing or at least available to execute workloads, or "down" if it is not capable of executing workloads. The determination of whether a given node is capable of executing a workload may be based, for example on the aforementioned heartbeat messages. In some cases, these heartbeat messages may be used to quantify a quality of a communication between the node and the cluster and thereby determine the node's ability to execute a workload. Additionally or alternatively, a quality of an access of the node to cluster storage may be used to determine whether the node is capable of executing a workload. Additionally or alternatively, each node may run a diagnostics or health check process, and the results of that process may be communicated to other nodes in the cluster.

In a typical datacenter, when one node does not communicate with the other nodes in a cluster, the workloads, such as VMs on that node are automatically moved to other nodes in the cluster. If the original node is still able to handle the assigned workloads and the loss of communication is temporary and/or does not affect the ability of the original node to handle them then moving the assigned workloads would be inefficient and potentially disruptive to workload clients and to the workload itself. For example, reassigning a running VM to a different node is similar in effect to crashing the VM and restarting it on a different host as this may cause loss of data and incurs higher downtime because the VM has to do a clean operating system startup. The process of determining when to redistribute workloads from non-communicating nodes can be improved by using heuristics to evaluate if the node is still able to handle the workload and/or if communication is likely to be restored.

Typically, cluster nodes are designated as either "Up" and running workloads, or "Down" and not assignable for running workloads. To improve datacenter resiliency, an intermediate "Isolated" state may be introduced wherein the node is not an active part of the cluster system, but is probably able to continue running the workloads based on the information available about the node. The cluster allows the currently assigned workloads to remain on the isolated node under the assumption that the node is still operating but not in communication with the active cluster nodes. The Isolated node will continue to run workloads that it was previously running if possible with the expectation that communications will be restored. In case of VMs, for example, if an Isolated node cannot run the VMs due to storage connectivity issues, the Isolated node may automatically pause the VMs instead of causing the VM to be crashed.

To be a fully "active" member of the cluster, a node may be required to meet a strict set of criteria, such as being fully connected and communicating, responding to messages from other nodes, writing data to a global update manager, etc. If all of the criteria are not met, a node may not be considered as "active." However, the node may still be capable of running certain types of workloads even if it is not fully active. The types of workloads that can still efficiently run on the node depend upon the particular failure or deficiencies detected. It is understood that the node will attempt to correct a failure and to return to being a fully active member of the cluster. In other cases, the workloads on the "failed" node may be paused while the node is reset, such as to recover from a transient failure. In the event that the node is able to become fully active again, it may be allowed by a cluster with quorum to continue running workloads in the meantime.

Heuristics are used to decide when a node can be placed in an Isolated state instead of going to a Down state even though the node is no longer an active part of the cluster system. This enables the node to continue running workloads or to preserve the workloads in a paused state instead of crashing them.

A node cannot remain in an Isolated state indefinitely. Eventually, the node must be moved to a Down state if it does not regain communication with the other nodes and does not rejoin the cluster. The cluster may establish a maximum time for a node to be Isolated before moving the workloads on other nodes. The maximum time for a node to operate in an Isolated state may be workload specific so that the node isolation timeouts are based on the type and priority of the assigned workloads. A set Isolation time may be defined for different types of workloads, and as the time expires for each workload, its ownership is assigned to a different node.

Figure 4:
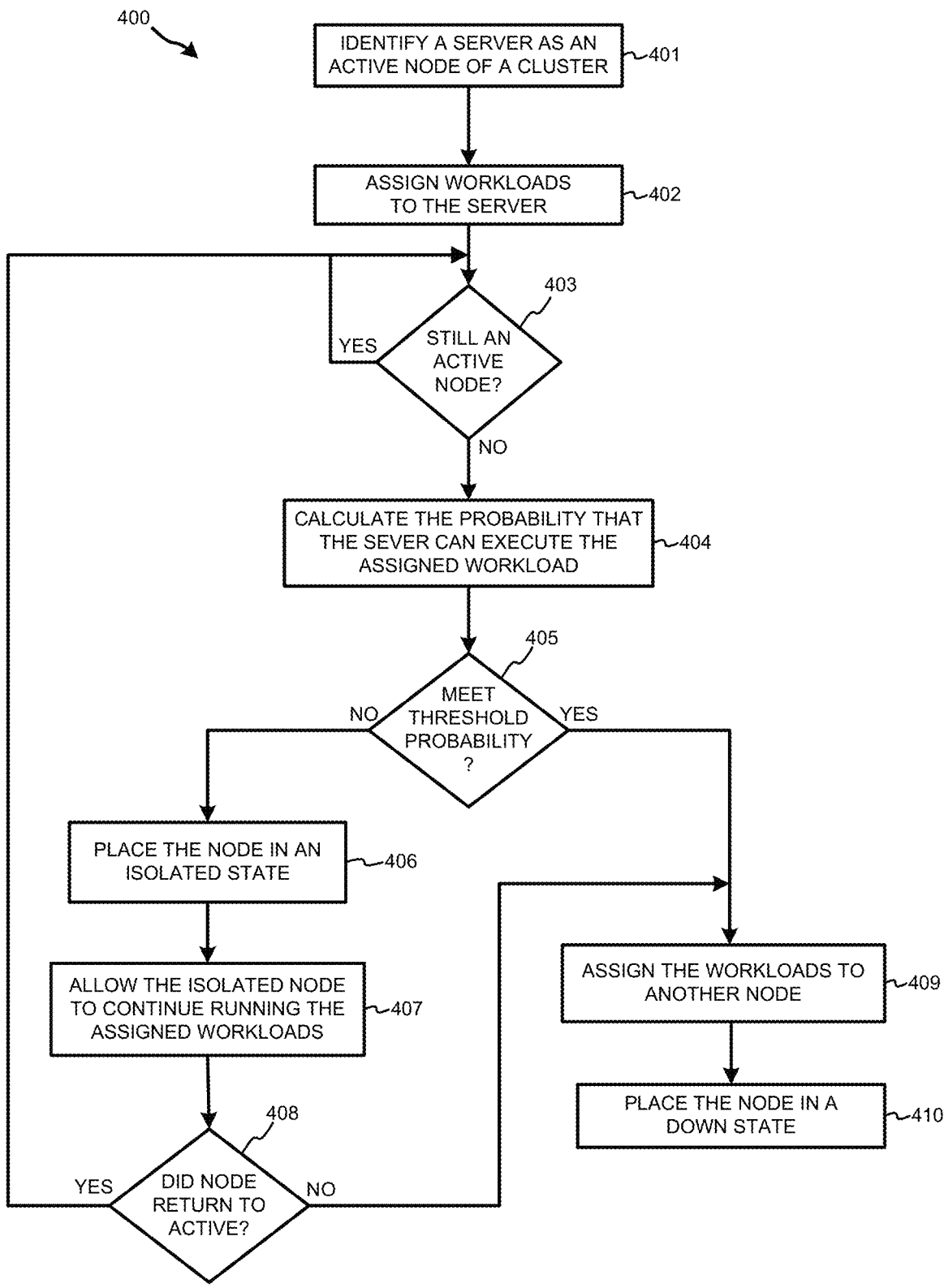
FIG. 4 is a flowchart of an example of a method for workload processing for clustered systems according to some embodiments.

FIG. 4 is a flowchart of an example of process 400 for workload processing for clustered systems according to some embodiments. In some implementations, process 400 may be performed, for example, by one or more of components 301-305 shown in FIG. 3. At step 401, a server is identified as an active node of a cluster. Such active nodes may be designated as being in an Up state. At step 402, workloads are assigned to the server. At step 403, a cluster with quorum determines whether the server is still an active node of the cluster. For example, determining that the server is no longer an active node may include determining that the server has intermittent or unreliable communications with other nodes in the cluster, does not have access to a storage system, or has failed a health check process. These issues may be quantified, for example, with respect to the quality of a communication between the server and the cluster or of an access to a storage system, or a severity of a failure of a health check process. If the node is still an active node of the cluster, then the node remains in an Up state and continues to run assigned workloads and to be available for additional workloads.

If the node is no longer an active node of the cluster at step 403, then the process moves to step 404 where a probability is calculated to determine the likelihood that the server is capable of continuing to execute the workload. In step 405, the probability is evaluated to determine whether it meets a selected threshold value. If the probability does meet the threshold value, then, at step 406, the node is placed in an Isolated state.

The probability calculated in step 404 may be based, for example, on communication-failure heuristics types. Information about a node's connectivity before it left the cluster system may be used in the node-isolation heuristics. For example:

1) There has been intermittent packet loss between a target node and the other nodes in the cluster (e.g., a 40% heart beat packet loss). The cluster with quorum may assume that the target node is not part of the cluster is because the packets are being dropped by an intermediate router.

2) A node is removed from cluster due to asymmetric connectivity to other nodes (e.g., Node 1 can heartbeat to Node 2, but cannot heartbeat to Node 3). The cluster can set the node to an Isolated state.

3) If all of the nodes in a subnet stop communicating to each other, then all of the nodes may be set to the Isolated state while communication is reestablished, such as when a subnet switch is rebooting.

4) If Node 1 and Node 2 use the same power supply and only Node 1 stops communicating, then Node 1 may be set to the Isolated state if Node 2 is still active since this indicates that Node 1 should also be receiving power.

Information provided by the node before it left the cluster system may also be used in the node-isolation heuristics. For example, if a node leaves the cluster membership because some components on the node crash, but the components are not critical to running the workloads, then the node can send a message to other cluster nodes that it would attempt to rejoin soon. The node can then be placed in the Isolated state thereby allowing it continue to run workloads.

The probability may also be based on storage failure heuristics, such as observations that the node has storage connectivity problems.

In step 407, the Isolated server is allowed to continue running its assigned workloads. Having met the probability threshold in steps 404, 405, it is assumed that the Isolated node is capable of continuing to run the workloads and that the Isolated node will eventually rejoin the cluster as an active node. The evaluation of whether a node is an active member of a cluster may be determined by a cluster with quorum, for example.

In step 408, cluster with quorum determines if the node has returned to being an active node on the cluster. If the node is now an active node, then it is allowed to continue running its assigned workloads. The node is then monitored in step 403 to determine that it remains active in the cluster. If the probability in step 405 is evaluated does not meet the selected threshold value or if the node does not return to active in step 408, then the workloads are assigned to another node in step 409. In step 410, after the node's workloads are reassigned, then the node is placed in a Down state.

The node may be allowed to run in an Isolated state for a predetermined time in step 407 before evaluating whether it has returned to being an active node on the cluster in step 408. The predetermined time may be based on the assigned workload on the Isolated node. Characteristics of the workload, such as priority or workload type (e.g., VM, database, storage, etc.), and the type of failure (e.g., loss of heartbeat signal) may be used to established a predetermined time for an Isolated node. Additionally, any information available about the Isolated node after the failure heuristic was applied can be used to establish or update (i.e., extend or shorten) the predetermined time for isolation operation. For example, if some active node receives any sort of communication from the Isolated node, then the Isolation state may be ended.

Different workloads on the Isolated node may have different unmonitored timeouts. The node may remain Isolated for the duration of the workload timeouts or as long as a workload is assigned. For example, workloads may be assigned high, medium, and low priorities and each priority may have a different timeout. The node will continue running the workload until the timeout or until the workload completes or is reassigned. Once the workloads have ended or been reassigned, the node may move to a Down state.

In the situation where an entire cluster goes down, such as due to a network switch reboot or a loss of quorum, all of the nodes will be inactive and may move to an Isolated state. The Isolated nodes will continue to run their assigned workloads according to the datacenter policies. When the cluster reforms, such as when the nodes are able to communicate again, the cluster can determine what workloads were running and on which nodes. The cluster may then keep the workloads assigned to those nodes, which have returned to an active state to reform the cluster.

When a cluster node or its network links have hardware, software, communication, or other issues that affect the performance of the cluster, the node may be set to a "Quarantined" or an "Extended Down" state. The workloads hosted on that Quarantined node may then be moved as gracefully as possible before the node fails or become Isolated. For example, if a node has persistent local storage issues, then the node may be quarantined for a relatively long duration instead of remaining a member of the cluster system.

Figure 5:
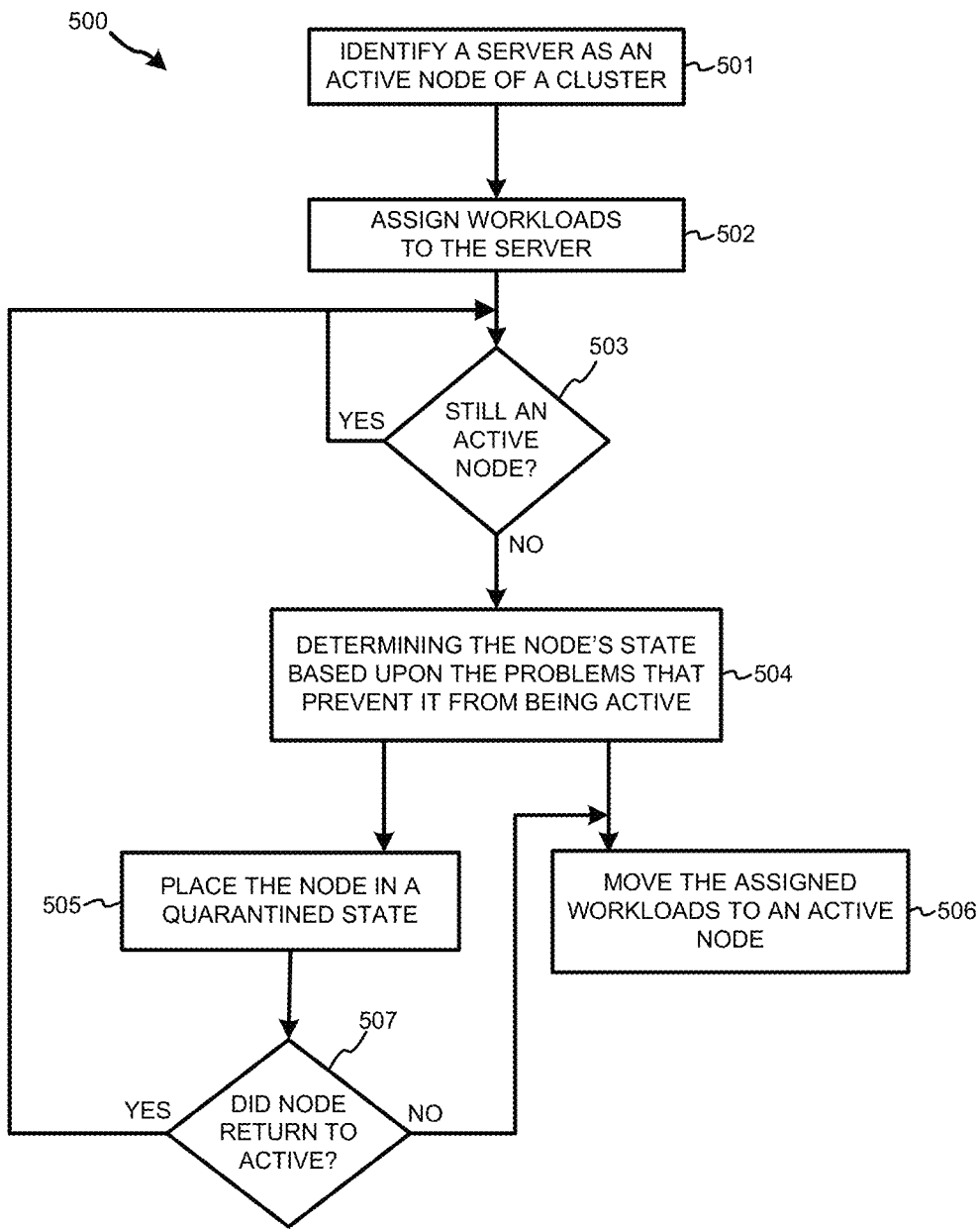
FIG. 5 is a flowchart of an example process for handling nodes with persistent problems.

FIG. 5 is a flowchart of an example process 500 for handling nodes with persistent problems. At step 501, a server is identified as an active node of a cluster. At step 502, workloads are assigned to the server. At step 503, a cluster with quorum determines whether the server is still an active node of the cluster. If the node is still an active node of the cluster, then the node continues to run assigned workloads and to be available for additional workloads.

If the node is no longer an active node of the cluster at step 503, then the process moves to step 504 where the future state of the node is determined based upon the problems that prevented it from being active. The determination may be based on different health parameters that allow the cluster to keep monitoring the node's readiness to participate in an active cluster without impacting the performance of the active cluster nodes or slowing their operations. Based upon that determination, the node is either placed in a Quarantined or Extended Down state in step 505 or the node's workloads are migrated to an active node in step 506.

The Quarantined state in step 505 indicates that no new workloads should be assigned to the node. Alternatively, the Quarantined state may indicate that no high-priority workloads should be assigned to the node or that only certain non-critical workloads should be assigned. If a workload does not require a certain levels of consistency, then it might be acceptable to assign such workloads to a Quarantined node.

The migration in step 506 may be a gracefully or graduated process that proceeds in an orderly manner if the node's problems indicate, for example, that it will fail eventually but not imminently. The node may provide an indication that the workload state is preserved and ready for migration before the workloads are moved. The opportunity to gracefully evacuate workloads will only available if the quarantine can be anticipated.

Once the nodes are placed in a Quarantined state in step 505, the Quarantined nodes are monitored in step 507 to determine if they have returned to being active nodes in the cluster. A node may come out of the Quarantined state, for example, by manual override by an admin, after expiration a defined time, if the issue that caused the failure has been corrected, or if the node or the active nodes determine that the issue that caused the failure is likely to have been remediated. When a defined time for a Quarantined node is set, the duration may be influenced by the nature of failures that lead to the node being put in quarantine.

In addition to using the Quarantine state to determine whether to assign new workloads to a node or to gracefully evacuate workloads from the node, Quarantine may also be used to remove a node's eligibility to participate in the cluster. For example, if the node's behavior indicates that it might adversely impact the performance and/or availability of the cluster or other workloads in the cluster, then the node may be quarantined. In some situations, the Quarantine state may be necessary, but the node will already be in such a degraded or failed condition that workloads cannot be migrated off. In other cases, the degraded or failed state of the node may have caused the workloads to fail prior to migration.

There are different ways a node can be quarantined. A node may be placed in a Quarantined state, but instead of being down for a long time, the node is not assigned any new workloads or does not run any workloads at all, but is still an active member of the cluster. Alternatively, the node may run its assigned workloads, but not receive any new workloads.

In some embodiments, the number of nodes that can be placed in the Quarantined state is limited. For example, depending upon the number of nodes in the system or the cluster, only a certain number or predetermined percentage of the nodes may be quarantined at one time. In other embodiments, the length of the Quarantined state may be limited, such as by allowing only one node at a time to be quarantined and further limiting each node to being quarantined for a set time, such as ten minutes.

The progression of node state from better to worse can be characterized as Up (able to do anything a cluster node does), Isolated (not good enough to be a fully active node, but still able to run some workloads), Down (neither a fully active node nor running workloads), and Quarantined (not fully active and prohibited from even trying to become fully active). As a transition step into the Quarantined state, a cluster or the node itself may attempt to migrate workloads to Up servers. Alternatively, as a transition step into or out of Quarantine, a node may be allowed to be in an Up state, but no important workloads are assigned to it (e.g., in a parole status).

A non-exclusive example of a computer-implemented method for managing nodes comprises identifying a server as an active node of a cluster, and assigning a workload to the server in response to the identification. After the assignment, the method further includes, determining that the server is no longer an active node of the cluster. In response to the determining, the method further includes calculating a probability that the server is capable of continuing to execute the workload and then deciding, based upon the probability, whether to allow the workload to remain assigned to the server.

The cluster may include a plurality of active nodes, and wherein the cluster is configured to operate as a datacenter with respect to one or more remote clients. The assigned workload on a node may include a virtual machine or any other workload in a datacenter.

The step of determining that the server is no longer an active node of the cluster may include, for example, determining that the server has intermittent or unreliable communications with the cluster, does not have access to a storage system, and/or has failed a health check process.

The step of determining the probability may include quantifying a quality of a communication between the server and the cluster, a quality of an access of the server to a storage system, and/or a severity of a failure of a health check process.

In addition to the steps recited above, the method may include allowing the server to continue running an assigned workload for a period of time after the determination, wherein selecting the period of time may be based upon the probability or upon a priority or type of the workload.

In addition to the steps recited above, the method may include designating the server as a degraded node during the period of time and/or determining, based upon the probability, to migrate the workload to a different server.

In addition to the steps recited above, the method may include detecting an improvement in a quality of a communication between the server and the cluster or an access of the server to a storage system, and determining, after the detecting, that the server be again designated as an active node of the cluster. In some embodiments, the detecting may occur after the workload has been entirely executed by the server.

In addition to the steps recited above, the method may include detecting a lack of improvement in a quality of a communication between the server and the cluster or an access of the server to a storage system, and taking a remedial action with respect to the workload. The remedial action may include, for example, moving the workload to another server in the cluster.

A system for managing workloads may comprise, for example, at least one processor, and a memory coupled to the at least one processor. The memory may have stored thereon computer-executable instructions that, upon execution by the at least one processor, cause the system to assign a workload to a node designated as an active node of a cluster, identify an issue that causes the node to lose the active node designation, and designate the node as a quarantined node.

The issue may include, for example, an intermittent or unreliable communication with the cluster, an intermittent or unreliable access to a storage system, or a failure of a health check.

The computer-executable instructions, upon execution by the at least one processor, may further cause the system to prevent a new workload to be sent to the node while the node has the quarantined node designation or to send a low-priority workload to the node while the node has the quarantined node designation.

The computer-executable instructions, upon execution by the at least one processor, may further cause the system to receive an indication from the node that a state of the workload has been preserved, and migrate the workload to another node of the cluster.

A physical computer-readable medium or device that does not comprise propagated signals may have computer-executable instructions stored thereon that, upon execution by a processor of a computer system, cause the computer system to assign a workload to a server designated as an active node of a cluster. The instructions further cause the computer system to identify an issue that causes the server to lose the active node designation, maintain the workload assigned to the server in response to a determination that the sever is at least temporarily capable of continuing to execute the workload, receive an indication from the server that a state of the workload has been preserved, and migrate the workload to another server of the cluster.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    identifying a server as an active node of a computing cluster based on a set of predetermined operational criteria, the computing cluster having multiple servers interconnected with one another via a computer network;
    assigning a workload to the server for execution when the server is identified as an active node in the computing cluster;
    subsequent to assigning the workload to the server,
        monitoring an operational state of the server in the computing cluster;
        indicating that the server is no longer an active node of the computing cluster when the monitored operational state of the server violates one or more of the operational criteria; and
    in response to indicating that the server is no longer an active node,
        calculating, based on communication-failure heuristics, a probability that the server is still capable of continuing to execute the assigned workload despite no longer being an active node; and
        allowing the assigned workload to remain assigned to and executed by the server without migrating the assigned workload to another server in the computing cluster when the calculated probability exceeds a preset threshold.

2. The computer-implemented method of claim 1, wherein the computing cluster includes a plurality of active nodes, and wherein the cluster is configured to operate as a datacenter with respect to one or more remote clients.

3. The computer-implemented method of claim 1, wherein the assigned workload includes a virtual machine to be executed on the server.

4. The computer-implemented method of claim 1, wherein indicating that the server is no longer an active node of the computing cluster includes determining that the server has intermittent or unreliable communications with other servers of the computing cluster, does not have access to a storage system in the computing cluster, or has failed a health check process in the computing cluster.

5. The computer-implemented method of claim 1, wherein calculating the probability includes quantifying a quality of a communication between the server and other servers in the computing cluster, a quality of an access of the server to a storage system in the computing cluster, or a severity of a failure of a health check process related to the server.

6. The computer-implemented method of claim 1, further comprising:
    allowing the assigned workload to remain assigned to the server includes allowing the server to continue executing an assigned workload for a preset period of time after indicating that the server is no longer an active node in the computing cluster.

7. The computer-implemented method of claim 6, further comprising setting the period of time during which the server is allowed to continue executing the assigned workload based upon the calculated probability.

8. The computer-implemented method of claim 6, further comprising setting the period of time during which the server is allowed to continue executing the assigned workload based upon a priority or type of the workload assigned to the server.

9. The computer-implemented method of claim 6, further comprising designating the server as a degraded node during the period of time and preventing additional workload from being assigned to the server while the server is designated as a degraded node.

10. The computer-implemented method of claim 1, further comprising:
    migrating the assigned workload from the server to a different server in the computing cluster when the calculated probability does not exceed the preset threshold.

11. The computer-implemented method of claim 1, further comprising:
    detecting a change in a quality of communication between the server and other servers in the computing cluster or an access level of the server to a storage system; and
    in response to the detected change, determining whether the server can be again designated as an active node of the computing cluster based on the set of predetermined operational criteria.

12. The computer-implemented method of claim 11, wherein detecting the change includes detecting the change after the assigned workload has been entirely executed by the server.

13. The computer-implemented method of claim 6, further comprising:
    detecting a lack of change in a quality of communication between the server and other servers in the computing cluster or an access level of the server to a storage system; and
    in response to the lack of change, migrating the assigned workload from the server to a different server in the computing cluster when the period of time expires.

14. The computer-implemented method of claim 13, further comprising designating the server as an inactive server when the period of time expires and preventing additional workload to be assigned to the server.

15. A computer-implemented method in a computer cluster having multiple servers interconnected with one another via a computer network, comprising:
    assigning an application to a server for execution, the server being currently designated as an active node in the computing cluster based on a set of predetermined operational criteria;
    subsequent to assigning the application to the server for execution,
    indicating that the server is no longer an active node in the computing cluster when one or more operational state of the server violates at least one of the predetermined operational criteria; and
    in response to indicating that the server is no longer an active node,
        calculating, based on communication-failure heuristics, a probability that the server is still capable of continuing to execute the assigned application despite of that the one or more operational state of the server violates at least one of the predetermined operational criteria based on one or more operational state of the server before the server is no longer an active node in the computing cluster;
        when the calculated probability exceeds a preset threshold, allowing the server to continue executing the assigned application without migrating execution of the application from the server to one or more other servers in the computing cluster; and when the calculated probability does not exceed the preset threshold, migrating execution of the application from the server to one or more other servers in the computing cluster.

16. A computing system, comprising:

at least one processor; and a memory coupled to the at least one processor, the memory containing computer-executable instructions that, upon execution by the at least one processor, cause the system to:

assign a workload to a node currently designated as an active node in a computing cluster for execution, the assigned workload including an application or a task to be executed on the node;

subsequent to assigning the workload to the node in the computing cluster, identify an issue that causes the node to lose the active node designation;

in response to identifying the issue, calculate, based on communication-failure heuristics, a probability that the node is still capable of continuing to execute the assigned workload despite of the identified issue based on one or more operational parameters of the node related to communication, storage access, or health check before the node lost the active node designation;

perform a comparison of the calculated probability with a predetermined threshold; and based on the performed comparison, when the calculated probability exceeds the threshold, designate the node as a quarantined node and allow the node to continue executing the assigned workload without having to migrate the assigned workload to one or more other nodes in the computing cluster.

17. The computing system of claim 16, wherein the issue includes an intermittent or unreliable communication with the cluster, an intermittent or unreliable access to a storage system, or a failure of a health check.

18. The computing system of claim 16, wherein the computer-executable instructions, upon execution by the at least one processor, further cause the system to prevent a new workload to be assigned to the node while the node has the quarantined node designation.

19. The computing system of claim 16, wherein the computer-executable instructions, upon execution by the at least one processor, further cause the system to assign a low-priority workload to the node while the node has the quarantined node designation.

20. The computing system of claim 16, wherein the computer-executable instructions, upon execution by the at least one processor, further cause the system to:

based on the performed comparison, when the calculated probability does not exceed the threshold, receive an indication from the node that a state of the assigned workload has been preserved; and migrate the assigned workload from the node to another node of the computing cluster currently designated as an active node.

\* \* \* \* \*